(12) United States Patent
Wilk

(10) Patent No.: US 8,769,226 B2
(45) Date of Patent: Jul. 1, 2014

(54) DISCOVERING CLUSTER RESOURCES TO EFFICIENTLY PERFORM CLUSTER BACKUPS AND RESTORES

(75) Inventor: Tomasz F. Wilk, Longwood, FL (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/544,473

(22) Filed: Jul. 9, 2012

(65) Prior Publication Data

US 2012/0278287 A1 Nov. 1, 2012

Related U.S. Application Data

(63) Continuation of application No. 12/773,172, filed on May 4, 2010, now Pat. No. 8,219,769.

(51) Int. Cl.
*G06F 12/00* (2006.01)
*G06F 13/00* (2006.01)
*G06F 13/28* (2006.01)

(52) U.S. Cl.
USPC .................. 711/162; 711/E12.103; 707/640; 718/102; 713/1

(58) Field of Classification Search
USPC ........... 711/162, E12.103; 707/640; 718/102; 713/1
See application file for complete search history.

(56) References Cited

U.S. PATENT DOCUMENTS

| | | | |
|---|---|---|---|
| 8,219,769 B1 * | 7/2012 | Wilk .............................. | 711/162 |
| 2010/0332657 A1 * | 12/2010 | Elyashev et al. .............. | 709/226 |
| 2011/0252271 A1 * | 10/2011 | Frenkel et al. ................. | 714/4.1 |
| 2013/0061014 A1 * | 3/2013 | Prahlad et al. ................ | 711/162 |

* cited by examiner

*Primary Examiner* — Edward Dudek, Jr.
(74) *Attorney, Agent, or Firm* — Rory D. Rankin; Meyertons, Hood, Kivlin, Kowert & Goetzel, P.C.

(57) ABSTRACT

A system and method for identifying properties of virtual resources to efficiently perform backups and restores of cluster data. A cluster of nodes is coupled to a data storage medium. A node receives a request for a backup or a restore of cluster data. In response to this request, the node queries a cluster subsystem and a virtual subsystem of all other cluster nodes for identification of VMs, a subset of corresponding stored data, and an identification of VMs which are highly available (HA). In response to receiving query responses, the node aggregates the results and sends them to a backup server. These to aggregated results may then be used to schedule subsequent backup and restore operations. In addition, the node may use the results to complete the current backup or restore operation.

20 Claims, 5 Drawing Sheets

DISCOVERING CLUSTER RESOURCES TO EFFICIENTLY PERFORM CLUSTER BACKUPS AND RESTORES

PRIORITY INFORMATION

This invention is a continuation application of U.S. patent application Ser. No. 12/773,172, entitled "DISCOVERING CLUSTER RESOURCES TO EFFICIENTLY PERFORM CLUSTER BACKUPS AND RESTORES", filed May 4, 2010 now U.S. Pat. No. 8,219,769.

BACKGROUND OF THE INVENTION

1. Field of the Invention

This invention relates to the field of computer processing and, more particularly, to identifying properties of virtual resources to efficiently perform cluster backups and restores of cluster data.

2. Description of the Related Art

In order to protect data, the contents of information servers and end-user systems may be backed up to a data storage subsystem by a backup system configured by an information technology (IT) administrator. In addition to an efficient data backup system, a company may utilize a high availability of services provided by clusters of nodes coupled via a network. With cluster computing, a second node in the cluster provides service when any of at least the following events occur: a first node fails, a first node is chosen to move for load balancing purposes, or a first node is temporarily out of service for upgrades or maintenance service. In addition, migration may occur at a finer granularity level than at a node level, such as at a level of virtual machines (VMs) within the nodes.

A server operating system, for example Windows Server® 2008 R2, may comprise a virtual subsystem that is aware of VMs running locally on a corresponding node, but is unaware of VMs running on other cluster nodes. In addition, the virtual subsystem may not distinguish between highly available (HA) and non-highly available (non-HA) virtual machines (VMs). At least three problems may arise due to these limitations during backup and restore operations on VMs within the cluster. A first problem may occur when a restore operation is performed on a HA VM. Typically, corresponding cluster resources are taken offline prior to restoring the HA VM. The virtual subsystem is unaware whether the corresponding VM is highly available, and therefore, it is unknown whether and which cluster resources are taken offline.

A second problem related to the limitations discussed above is a possibility of backing up the same data multiple times when a cluster shared volume is used in the computing system. The virtual subsystem is unaware of VMs running on other cluster nodes other than the controlling node for the backup operation. The virtual subsystem does not have sufficient information to identify write-protected files within a cluster shared volume. Customers may initially perform a volume-level backup to obtain full volume flat file backups. At a later time, customers may perform an agent-based backup operation of particular data used by a given node. Because a node performing a volume level backup has no knowledge of which portions of a cluster shared volume are used by particular applications on another node, a volume level backup will simply perform a backup of the entire volume. Subsequently, when the agent level backup is performed, the agent level backup will backup data, which was also backed up during the volume level backup.

A third problem related to the limitations discussed above is an IT administrator who is coordinating backup schedules may not have an accurate picture of the cluster over time. The migration and the elevation to high availability of VMs occur over time. Therefore, a daily backup job targeting a given VM may be unable to proceed since the backup job may not know whether the given VM is now highly available and the backup job may not know the current location of the given VM.

In view of the above, methods and mechanisms for identifying properties of virtual resources to efficiently perform cluster backups and restores of cluster data are desired.

SUMMARY OF THE INVENTION

Systems and methods for identifying properties of virtual resources to efficiently perform cluster backups and restores of cluster data are contemplated. In one embodiment, a computer system includes a cluster comprising at least two nodes coupled to a data storage medium. Each of the cluster nodes comprises one or more virtual machines (VMs). A first node may be a predetermined controlling node within the cluster that receives a request for a backup or a restore operation. In response to this request, the controlling node generates queries to a virtual subsystem of each other cluster node and a query to a cluster subsystem within the controlling node. In response to receiving a query to a respective virtual subsystem, each of the other nodes identifies a list of included VMs and a subset of the stored data corresponding to the VMs. In response to receiving a query to a respective cluster subsystem the cluster controlling node identifies a list of included highly available (HA) VMs within the cluster. In response to receiving all query responses, the controlling node aggregates the resulting information. The controlling node may use this information to determine a location of a particular VM and whether the particular VM is HA or non-HA. In addition, the controlling node may send the information to a backup server. An IT administrator may use the included information to schedule subsequent backup and restore operations.

These and other embodiments will be appreciated upon reference to the following description and accompanying drawings.

Figure 1:
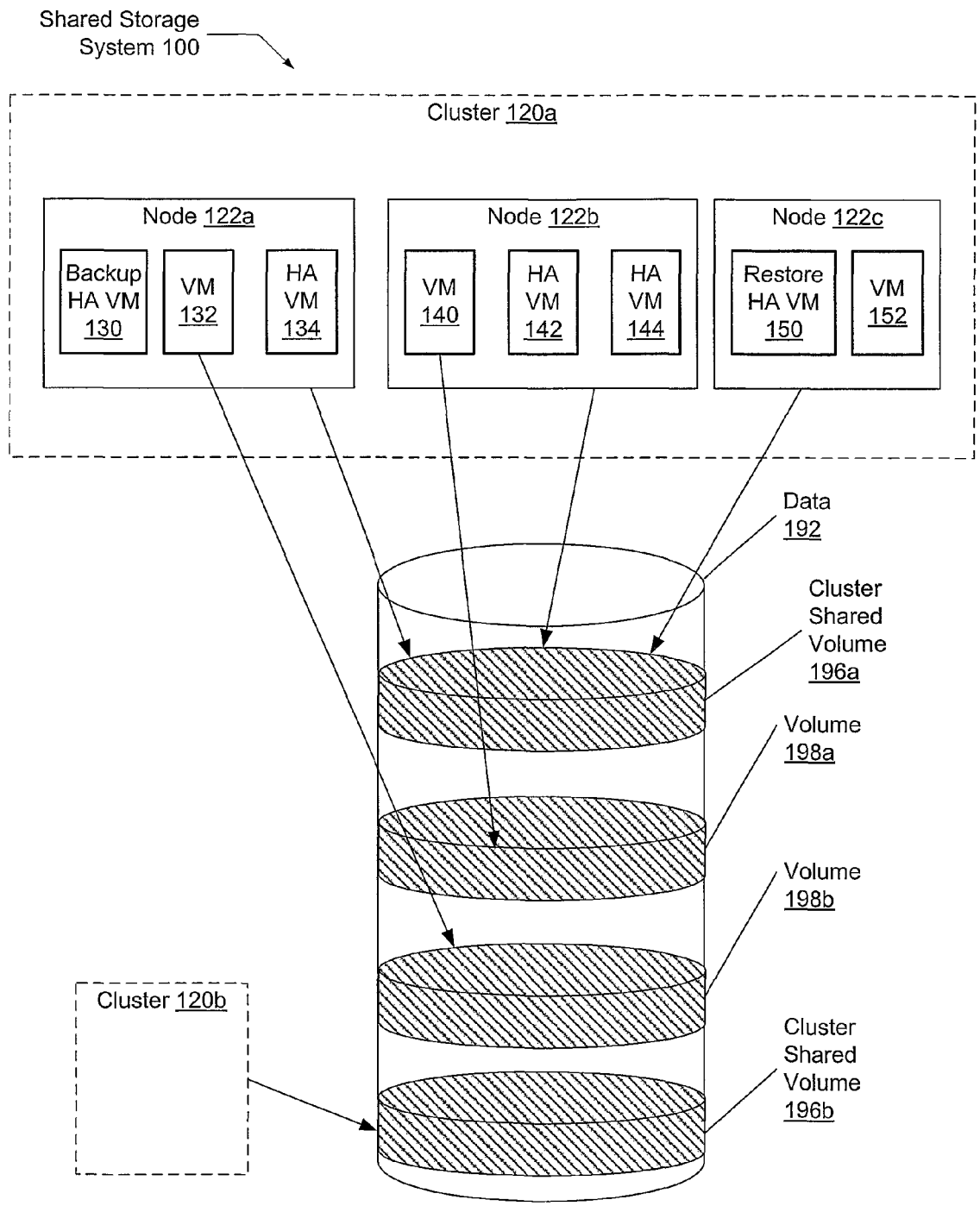
FIG. 1 is a generalized block diagram illustrating one embodiment of a cluster shared storage system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, signals, computer program instruction, and techniques have not been shown in detail to avoid obscuring the present invention.

Referring to FIG. 1, a generalized block diagram of one embodiment of a cluster shared storage system 100 is shown. Generally speaking, a cluster, such as cluster 120a and cluster 120b, is a group of linked nodes. The nodes, such as node 122a, node 122b, and node 122c, are typically connected to one another through fast local area networks (LANs), which are not shown to simplify the illustration. Each of clusters 120a and 120b may include any number of nodes. Node 122a, node 122b, and node 122c are shown for illustrative purposes, but cluster 120a is not limited to linking three nodes. Each node may be a single computer or a multi-processor system.

Each processor within a node in system 100 may host one or more virtual machines, wherein each virtual machine is configured to execute multiple software applications. For example, node 122a comprises VM 130, VM 132, and VM 134. Similarly, node 122b comprises VM 140, VM 142, and 144, and node 122c comprises VM 150 and VM 152. As is well known to those skilled in the art, virtualization may be used in desktops and servers to fully or partially decouple software, such as an operating system (OS), from a system's hardware. Virtualization may provide an end-user with an illusion of multiple OSes running on a same machine each having its own resources.

Cluster 120a may share a storage resource, such as data 192 stored on a data storage medium. In one embodiment, the data 192 may be stored on one or more hard disks. In one embodiment, the one or more hard disks may be arranged into logical, redundant storage containers or RAID arrays (redundant arrays of inexpensive/independent disks). In one embodiment, each of the nodes 122a-122c may share the data within cluster shared volume 196a on data 192. In addition, each of the nodes 122a-122c may access data within data 192 that is not shared with other nodes. Similarly, each of the VMs within nodes 122a-122c may both share data within a cluster shared volume and access data that is not shared with other VMs. For example, VM 132 may share data within cluster shared volume 196a and access data within volume 198b. VM 140 may share data within cluster shared volume 196a and access data within volume 198a. Alternatively, a VM may share data within a cluster shared volume and access data in a volume that is shared by one or more other VMs that are not highly available. A highly available (HA) VM, such as HA VM 130, HA VM 134, HA VM 142, HA VM 144 and HA VM 152 may each share data within a given cluster shared volume and access data within a volume that is not shared by any other VM or HA VM.

Typically, all dependent resources with a same logical unit number (LUN) are unable to independently move. Therefore, during failover, each resource within a dependent group is moved. A dependence on a disk resource includes a disk or a volume within a disk to be dismounted, moved, and remounted on a new cluster node. Any two HA VMs do not share a same LUN. Otherwise, the two HA VMs would be unable to fail over independently. In order for a given HA VM to failover independently, the given HA VM uses its own dedicated LUN or uses a cluster shared volume. The given HA VM may have other dependent cluster resources, which provides a link between cluster software and virtualization software as described further below.

A HA VM may freely move to and from any node in cluster 120a. For example, HA VM 130 may move from node 122a to node 122b. Such a move of a HA VM may result from any of at least the following events: a corresponding node fails, a corresponding node is chosen to move for load balancing purposes, or a corresponding node is temporarily out of service for upgrades or maintenance service. A VM, such as VM 132 in node 122a, may be enabled as a highly available VM when it is determined that the VM shares no dependency on a cluster resource other than a cluster shared volume that moves along with the VM during migration. Any corresponding cluster resource other than a cluster shared volume detected to be one that is both shared by other VMs and is dismounted and remounted during a migration operation may prevent a VM from being qualified as a highly available VM.

Continuing with the discussion above regarding dependent cluster resources, in contrast to a typical dependence on a standard cluster disk, a cluster shared volume may be a New Technology File System (NTFS) volume on a standard cluster disk that is made accessible for read and write operations by all nodes 122a-122c within the cluster 120a. The cluster shared volume may stay mounted and visible to all cluster nodes at all times providing a more efficient failover mechanism for corresponding HA VMs. Similarly, a second cluster shared volume may be accessible for read and write operations by all nodes within the cluster 120b. A cluster shared volume may not be unmounted and remounted during failover of HA VMs as is the case with a standard cluster disk. Cluster shared volumes may enable fast live migration of HA VMs since the physical disk resource is not moved between nodes during failover. One example of such characteristics includes the live migration and the cluster shared volume features in the server operating system Windows Server® 2008 R2.

A cluster, such as cluster 120a, may be deployed to improve performance and/or availability over that of a single computer or a single node. A cluster takes advantage of the parallel processing power of the included nodes to provide high performance and/or high availability. In order to ensure constant access to service applications, cluster 120a may maintain redundant nodes that can act as a backup node in the event of failure of another node. The minimum number of nodes in a high availability (HA) cluster is two—one active and one redundant—though typical HA clusters use more nodes. HA clusters may ensure round-the-clock access to computational power. This feature may be especially important in business, where data processing is usually time-sensitive.

The system's hardware in each processing unit within each of the nodes 122a-122c may include typical computer hardware such as one or more processors, each with one or more processing cores, a memory hierarchy with different levels of caches, logic for system bus management or packet processing, interfaces for peripherals, and so forth. In one embodiment, a binary translation technique may utilize a host architecture approach that installs and runs a virtualization layer, such as a virtual machine monitor, as an application on top of an OS, such as a guest OS. This approach may translate kernel code to replace instructions that do not correspond to a virtual subsystem, which may be a part of an x86 architecture, with new sequences of instructions that have the intended effect on virtual hardware.

In another embodiment, virtualization may utilize a combination of hyper calls and direct execution techniques. This virtualization approach utilizes a hypervisor architecture approach that installs a virtualization layer, such as a hypervisor, directly on the hardware of a system. A hypervisor is a type of virtual machine monitor (VMM) that runs directly on hardware, rather than on top of an OS. A hypervisor may provide each virtual machine with all the services of the physical system, including virtual basic-input-output-software (BIOS), virtual peripheral devices, and virtualized memory management. Hypervisor based virtualization solutions include Xen, VMware ESX Server and Microsoft's Hyper-V® technology.

Since a hypervisor has direct access to the hardware resources rather than going through an OS, a hypervisor may be more efficient than a hosted architecture. The use of a hypervisor may include modifying the kernel of a guest OS to replace non-virtualizable instructions, which may be a part of an x86 architecture, with hypercalls that communicate directly with the hypervisor. The hypervisor may also provide hypercall interfaces for other critical kernel operations such as memory management, interrupt handling, and time keeping.

Each VM is capable of executing one or more software applications. A typical high availability (HA) cluster may utilize HA virtual machines (VMs) to provide high-availability for applications running on the HA VMs. As already discussed, in the event of a physical server or computer failure, affected HA VMs may be automatically restarted on other servers with spare capacity. Therefore, unplanned downtime may be minimized. A server operating system (OS), for example Microsoft Windows Server® 2008 R2, running on a given node in a cluster may comprise a cluster subsystem. The cluster subsystem may provide services that include at least failover operations and network/component load balancing. This cluster subsystem may be aware of HA VMs within a cluster, but may not be aware of non-HA VMs.

In addition to the cluster subsystem, a server (OS) may comprise a hypervisor-based virtualization subsystem, for example Microsoft Hyper-V®. A virtual subsystem may be aware of VMs running locally on a corresponding node, but may not be aware of VMs running on other cluster nodes. Additionally, the virtual subsystem may not distinguish between highly available (HA) and non-highly available (non-HA) virtual machines (VMs). The limitations of the two subsystems (cluster subsystem and virtual subsystem) may lead to issues during both the scheduling and the execution of backup operations in addition to the execution of restore operations as discussed below.

Figure 2:
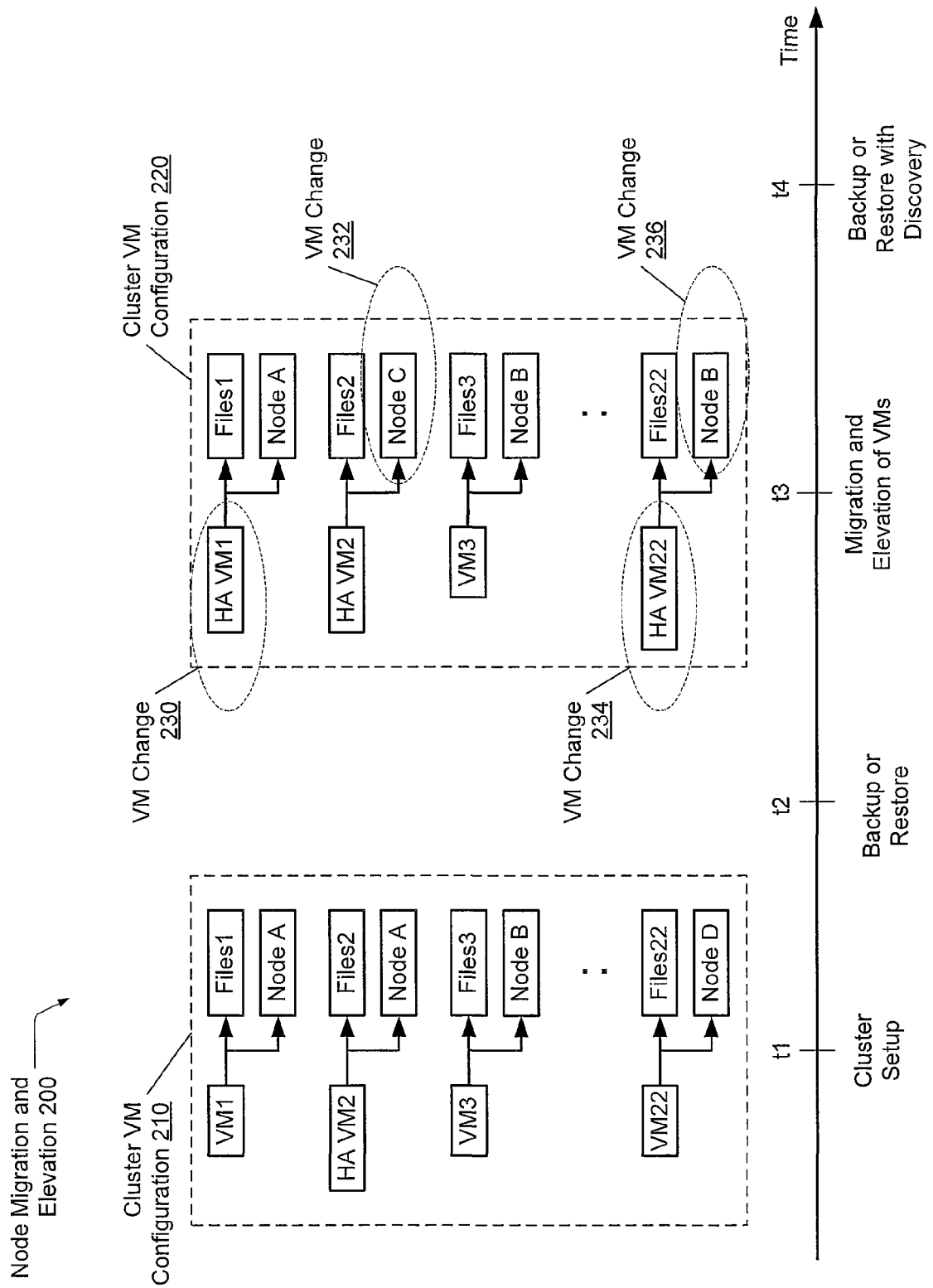
FIG. 2 is a generalized block diagram illustrating one embodiment of virtual machine migration and elevation.

Turning now to FIG. 2, a generalized block diagram of one embodiment of virtual machine migration and elevation 200 is shown. A representation of a configuration of VMs within a given cluster is shown with Cluster VM Configuration 210. This configuration may be an initial configuration set up by an information technology (IT) administrator during system setup at time t1. For example, VM1 may be comprised within a Node A and be associated with Files1. VM1 may be a non-HA virtual machine. A VM2 may be a HA virtual machine and be comprised within the same Node A. The HA VM2 may be associated with Files 2. One or more files within each of Files1 and Files2 may be the same and may be shared among the virtual machines VM1 and HA VM2. As shown, the virtual machines VM3 and VM22 are comprised within Node B and Node D, respectively, and are associated with corresponding files. Other virtual machines and other nodes may be used in a cluster configuration. The configuration shown in Cluster VM Configuration 210 is for illustrative purposes.

Over time, customers may wish to backup data stored on a data storage medium comprised within the given cluster, such as data within data 192 in FIG. 1. A backup may be performed for multiple reasons such as added protection, a later system deployment for the setup of many computers, or otherwise. When backing up data, customers may elect to use an initial volume-level backup followed by an agent-based backup. A volume-level backup operation may provide a full volume flat file image backup file. The state of the data stored on disk at one instant in time may be referred to as a snapshot or a shadow copy.

A shadow copy of data stored on disk may exist side by side with a live volume and contain copies of all files on the volume available as a separate device. In the example shown, a snapshot operation may occur at time t2. An application that attempts to copy a full volume image also handles issues such as opened files and minimizing service interruption. A shadow copy service may be provided by the operating system. This service may be used to provide the ability to capture a state of a disk or a volume on a disk at one instant in time. One example of such a service is the Volume Shadow Copy Service (VSS). VSS is a service which provides backup infrastructure for Microsoft® Windows® operating systems, and is a mechanism for creating consistent point-in-time copies of data known as shadow copies.

An agent-based backup operation mentioned above that follows a volume-level backup operation might also use the snapshot service within an operating system. This snapshot service may be used to temporarily halt applications from running or performing read and write transactions before allowing the backup of selected files. A backup agent may be loaded onto each client to convey data files to a backup server according to a variety of schedules, policies, etc. A backup server may include or be further coupled to one or more disk storage devices, tape drives, or other backup media. An information technology (IT) administrator may create the schedule for the backup agent to convey data files to a backup server. In one embodiment, an agent-based backup operation may occur shortly after a volume-level backup operation. For example, a volume-level backup operation may occur on a weekly basis, whereas an agent-based backup operation may occur on a daily basis.

The VM configuration 210 may remain the same for a period of time that includes a backup snapshot operation that occurs at time t2. A description of the steps of a restore operation is provided later. However, over time, it is possible for VMs to migrate to other nodes due to failover or load balancing reasons. In addition, a non-HA VM may be elevated at a later time to be a HA VM. For example, at time t3, it is shown in VM Change 230 that VM1 is elevated from being a non-HA VM to being a HA VM. As shown in VM Change 232, the HA VM2 migrated from Node A to Node C. VM Change 234 and VM Change 236 show that VM22 has been elevated from a non-HA VM to a HA VM and has migrated from Node D to Node B. Accordingly, Cluster VM Configuration 220 at time t3 is different than Cluster VM Configuration 210 at time t1. A failover process may be aware of this information, but a separate backup process is unaware of this information.

Typically a dedicated backup agent on a backup-controlling node protects corresponding write-protected files by excluding these files from a volume-level backup in order to avoid redundancy. A backup manager may be configured to send a volume backup request to Node A, which may be a predetermined backup controlling node for the cluster. In this example, the volume backup request may have been sent to Node A at time t4. Both a virtual subsystem and VSS within an operating system running on Node A are aware of the files associated with Node A, but are unaware of files associated with other nodes in the cluster. Therefore, the dedicated backup agent on the backup-controlling node (Node A) within the cluster does not have a list of all write-protected files for the cluster. In addition, the virtual subsystem and VSS on Node A are unaware of VM Changes 232-236 shown in the example. The dedicated backup agent will backup write-protected files associated with other nodes other than the backup-controlling node. Subsequently, when an agent-level backup is performed on another node within the cluster, the agent-level backup will backup data, which was also backed up during the volume-level backup and redundancy occurs.

In addition, an information technology (IT) administrator who is coordinating backup schedules may not have an accurate picture of the cluster configuration over time. The IT administrator is unable to utilize the cluster's virtual subsystem alone to provide a current accurate picture of the location and the availability of VMs within the cluster. Further, corresponding cluster resources are taken offline prior to restoring a HA VM, such as HA VM2 that may be restored at time t2. However, a restore operation at time t4 for VM1 or VM22 may not take offline corresponding cluster resources, since the virtual subsystem is unaware these virtual machines are highly available.

To solve the issues described above, both the virtual subsystems and the cluster subsystems within nodes in a cluster may be queried. The queries may be performed from any node within the cluster and the results may be compared and aggregated into a single data set. A virtual subsystem within a given node may provide a first list of all VMs and files associated with the given node. A cluster subsystem may provide a second list of all highly available VMs associated with the cluster. The first list and the second list may be compared to identify the highly available VMs within the cluster and their associated nodes and files. The steps of such a discovery process may occur alone at predetermined times, during particular backup or restore operations, during each backup or restore operation, or a combination. A more detailed description of these steps is provided below.

Figure 3:
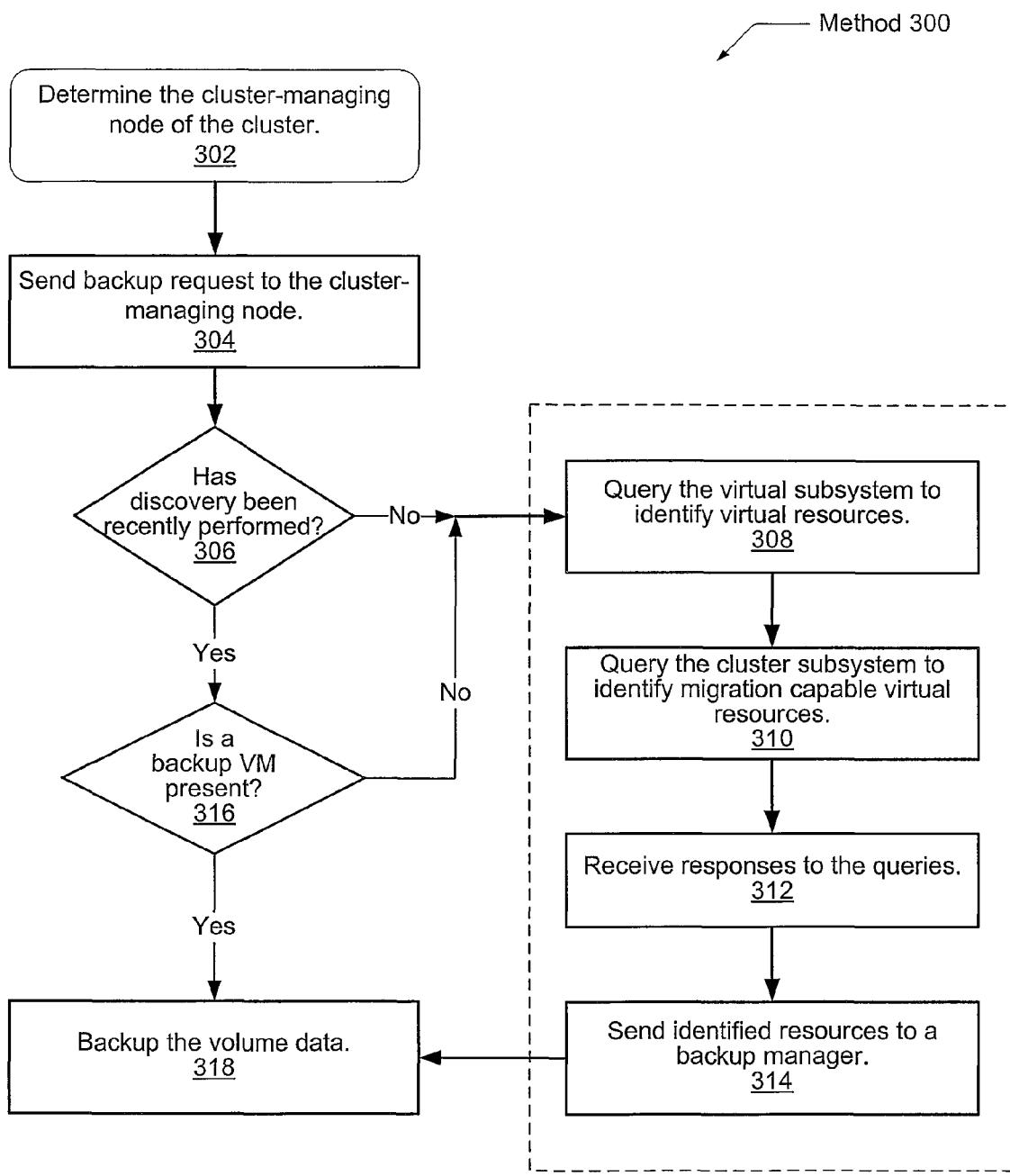
FIG. 3 is a flow diagram illustrating one embodiment of a method for a backup operation with discovery of a current cluster configuration.

Referring now to FIG. 3, one embodiment of a method 300 for a backup operation with discovery of a current cluster configuration is shown. The components embodied in the shared storage system 100 described above may generally operate in accordance with method 300. For purposes of discussion, the steps in this embodiment are shown in sequential order. However, some steps may occur in a different order than shown, some steps may be performed concurrently, some steps may be combined with other steps, and some steps may be absent in another embodiment.

In one embodiment, a backup job initiated by a backup manager targets a virtual cluster name. The backup manager is a backup software application running on a backup server. An IT administrator may set settings and schedules. Each cluster may have a unique virtual cluster name that represents it on the network. Nodes within a cluster may be added and removed, but the corresponding virtual cluster name may remain the same. In various embodiments, one of the cluster nodes may be selected to be a host for a corresponding virtual cluster. In one embodiment, the backup manager may attempt to connect with the virtual cluster name via the host. For example, if node 122a is selected to be the host of the cluster, then the backup manager may attempt to connect with it. One of the cluster nodes may be selected to be a controlling node for a corresponding cluster. In one embodiment, a same node may have the responsibilities of both the host and the controlling node for the cluster. In another embodiment, separate nodes may have the responsibilities of the host and the controlling node.

If a controlling node fails for any reason, then another node within the cluster may be chosen to be the controlling node. The backup manager or another application may be used to reassign the responsibilities of the host and the controlling node within the cluster. In block 302, the backup manager application running on the backup server may determine the controlling node of a particular cluster. In one embodiment, the backup manager may communicate with a predetermined hosting node within the cluster to obtain identification of the controlling node. In another embodiment, the backup manager may access a previously stored record or table. In yet another embodiment, the predetermined hosting node, which may be identified by a virtual cluster name for the corresponding cluster, is the cluster controlling node. Therefore when the backup manager sends messages to the virtual cluster name, the corresponding cluster node receives the messages. This controlling node may be referred to as a cluster-managing node in order to distinguish it from a cluster shared volume controlling node. In block 304, the cluster-managing node within a corresponding cluster may receive a volume-level backup request from the backup manager. Read and write transactions to all or a portion of a data storage medium storing data 192 may be halted.

A shadow copy service may be provided by the operating system. This service may be used to provide the ability to capture a point in time state of a disk or a volume. In one embodiment, when backing up a volume customers may elect to use an initial volume-level backup followed by an agent-based backup. The volume-level backup operation may utilize a shadow copy service provide by the operating system to manage the steps of the backup operation. One example of such a service is the Volume Shadow Copy Service (VSS) included in the Microsoft Windows® operating system. The VSS may interact with a virtual subsystem supplied by the operating system utilizing hypervisor technology. In addition, a cluster subsystem may be supplied by the operating system for failover operations.

An application programmer's interface (API) for each of the virtual subsystem and the cluster subsystem may allow each node to communicate with other nodes within the cluster and may allow system administrators and developers to write enterprise management applications. In various embodiments, each API may adhere to a standard. One example of such a standard includes the Microsoft Windows Management Instrumentation (WMI) Component Object Model (COM). WMI provides access to information that may also be available by other means via the operating system. For example, the name of the computer may be looked up in a registry, or an amount of free disk space on a drive may be determined. In addition, an identifier of a given virtual machine, a list of virtual machines, a list of drives and nodes, and so forth, may also be determined.

In some cases it may be difficult to retrieve information as described above, especially if scripts or other programs are being developed in different programming languages. WMI may allow a system administrator or a developer to retrieve system information using a standardized approach such as an object model. In some cases, database-like queries, such as SQL-like queries, may be used to obtain information. The WMI COM standard may determine how object implementers and interfaces handle tasks such as memory management, parameter management, and multithreading. By conforming to COM, a COM API for WMI written by a developer may ensure that the API supports the functionality provided by the interfaces of each WMI object. Each WMI object generally includes several properties containing system information.

A discovery process to determine a recent cluster configuration may be initiated by several factors. The cluster configuration may include information comprising at least one or more of the following: a list of virtual machines in the cluster, a corresponding node comprising each virtual machine, an indication whether a given virtual machine is highly available, and identification of stored data corresponding to a given virtual machine. In one embodiment, the cluster managing node may detect whether a discovery of a current cluster configuration has been performed. For example, a particular register may be set after each discovery process and reset after a predetermined amount of time. In another embodiment, a discovery request may be sent to a node, such as the cluster-managing node, within the cluster. In yet another embodiment, a discovery process may be initiated for each backup or restore operation. In other embodiments, a discovery process may be initiated during a backup or restore operation if a corresponding controlling virtual machine is no longer located within the cluster-managing node. Other factors for initiating a discovery process for a recent cluster configuration are possible and contemplated.

In the embodiment shown, if it is detected that a discovery process has not been recently performed (conditional block 306), then in block 308, the cluster-managing node sends queries to the virtual subsystems of other nodes within the cluster for identification of virtual machines and corresponding write-protected data subsets. Each node may communicate with corresponding applications to identify this information. For example, each node may communicate with its hypervisor and VSS to identify this information.

Once a given node receives a response from each queried application, the given node sends its complete response to the cluster-managing node. In one embodiment, the identification within a response may include corresponding metadata for the virtual machines and corresponding write-protected data subsets. In another embodiment, the identification within a response may include corresponding metadata for virtual machines and data subsets associated with particular applications. This data subset may include both data that is associated with an agent-based backup operation and data that are not associated with an agent-based backup operation. In one embodiment, each node packages its complete response according to a predetermined protocol before sending the response to the cluster-managing node. Further details of this process are described later.

In block 310, the cluster-managing node sends a query to the cluster subsystem for identification of highly available virtual machines within the cluster. Again, the HA VMs are capable of migrating across nodes within the cluster. The cluster-managing node may communicate with corresponding failover features of the operating system to identify this information. This step may be done concurrently with a query of the virtual subsystem of each other node.

In block 312, the cluster-managing node receives the responses to the queries from the other nodes. The cluster-managing node may combine the responses from the other nodes with its identification of its own lists of virtual machines, write-protected data subsets, and highly available virtual machines. In another embodiment, the cluster-managing node may keep the responses separate from one another and from its own identified lists. The cluster-managing node may inspect the individual responses separately. The cluster-managing node may inspect fields within corresponding metadata of the lists to determine which VMs are HA VMs, which nodes comprise these HA VMs, and which files correspond to these HA VMs. The identification of the write-protected data subsets may include addresses of locations within the data storage medium where the data subsets are stored. In one embodiment, in block 314, the cluster-managing node may send part or all of this information to the backup manager running on the backup server. The IT administrator may use this information to schedule subsequent backup operations.

If it is detected that a discovery process has been recently performed (conditional block 306), and a backup VM is not present in the cluster-managing node (conditional block 316), then control flow of method 300 moves to block 308 where discovery of the current cluster configuration is performed. The discovery process described above regarding steps 308-314 will determine which node within the cluster now comprises the backup VM. The backup VM may have been located within the cluster-managing node during an earlier point in time, but has since migrated. The backup VM may be a HA VM or a non-HA VM. When the backup VM is identified to be located in a new node, in one embodiment, prior to block 318, the backup manager may be instructed by a message to disconnect. After disconnection with the cluster-managing node, the identified new node may be assigned as a new cluster-managing node. Alternatively, the backup manager may directly connect with the new node for the current backup operation without reassignment of the cluster-managing node. Then the subsequent backup operation may begin at block 304 of method 300. In yet another embodiment, when the backup VM is identified to be located in a new node, the current cluster-managing node may forward the backup request to the new node in addition to conveying identification of the new node to the backup manager.

If it is detected that a discovery process has been recently performed (conditional block 306), and a backup VM is present in the cluster-managing node (conditional block 316), then in block 318, the backup operation is performed. In one embodiment, all identified files corresponding to the VMs within the cluster are backed up. In another embodiment, the corresponding data less the identified data subsets may be backed up. This backup may not be a full volume backup if write-protected data subsets are identified.

Figure 4:
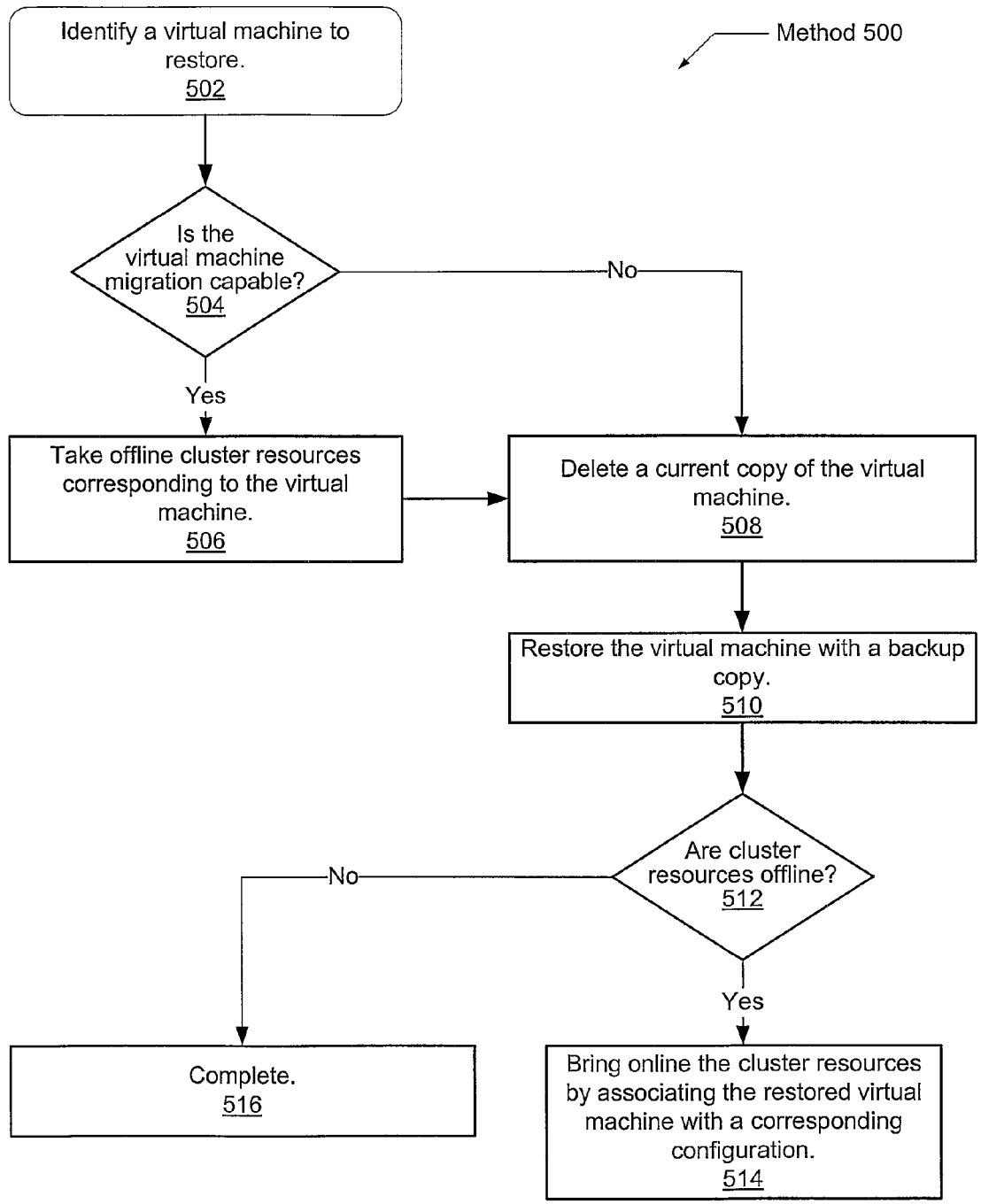
FIG. 4 is a flow diagram illustrating one embodiment of a method for a restore operation with discovery of a current cluster configuration.

Referring now to FIG. 4, one embodiment of a method 500 for a restore operation with discovery of a current cluster configuration is shown. The components embodied in the shared storage system 100 described above may generally operate in accordance with method 500. For purposes of discussion, the steps in this embodiment are shown in sequential order. However, some steps may occur in a different order than shown, some steps may be performed concurrently, some steps may be combined with other steps, and some steps may be absent in another embodiment.

In block 502, identification of a virtual machine to be restored occurs. If the virtual machine is highly available, then it is able to migrate to other cluster nodes. A determination of whether a given virtual machine is highly available may include the discovery steps 308-314 of method 300. These steps include querying both a virtual subsystem and a cluster subsystem in order to identify the location of virtual machines and to determine whether a given virtual machine is highly available. If the identified virtual machine to be restored is highly available (conditional block 504), then in block 506, corresponding cluster resources are taken offline. Therefore, a process that runs before the deleted virtual machine is restored does not wait for or expect steps to be performed by this virtual machine. If a failover or a backup process occurs while the virtual machine is deleted but remains in configuration and inventory lists, then these processes may be held in a wait state or complete incorrectly. Therefore, corresponding configuration files may be removed and then in block 508 the identified virtual machine may be removed from an inventory list within a corresponding virtual subsystem. In one embodiment, a VSS of the cluster may be notified of the restore and the VSS performs the operation of taking cluster resources offline.

In block 510, a backup copy of the identified virtual machine is used to restore the virtual machine. The virtual subsystem may automatically add the virtual machine to its inventory list. If the virtual machine did have corresponding cluster resources taken offline (conditional block 512), then in block 514, the virtual subsystem may additionally communicate with the VSS in the operating system to update configuration files to include an identifier corresponding to the virtual machine, which brings online the cluster resources for the virtual machine. If the virtual machine did not have corresponding cluster resources taken offline (conditional block 512), then in block 516, the restore operation is complete.

Figure 5:
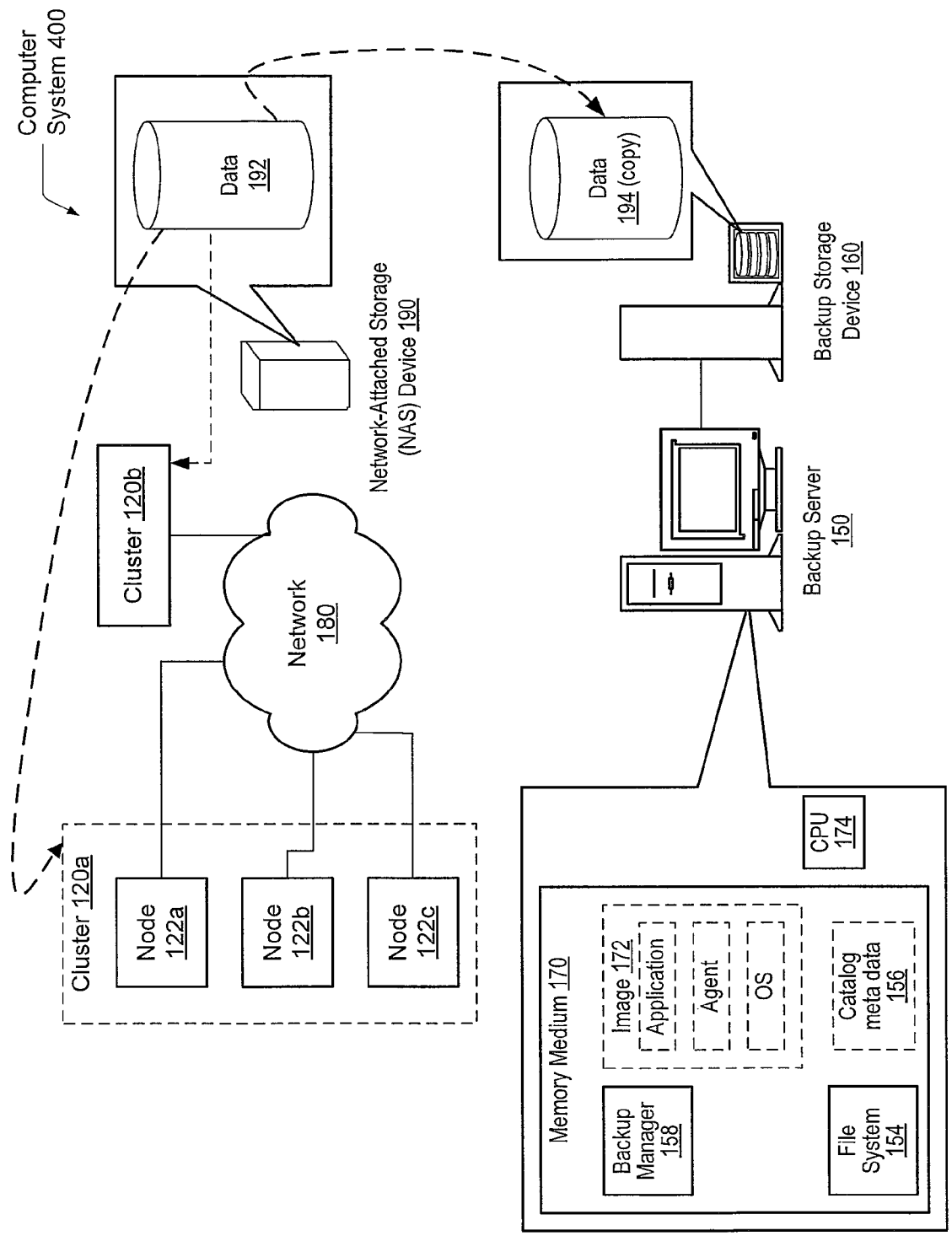
FIG. 5 is a generalized block diagram illustrating one embodiment of a computer system.

Referring to FIG. 5, a generalized block diagram of one embodiment of a computer system 400 is shown. The same system components used in shared storage system 100 of FIG. 1 are numbered identically. As shown, system 400 includes clusters 120*a* and 120*b* interconnected through a network 180 to one another, to a Network-Attached Storage (NAS) device 170 and to a backup server 150. Disk storage 160 is coupled to backup server 150. Network 180 may include a variety of techniques including wireless connection, direct local area network (LAN) connections, wide area network (WAN) connections such as the Internet, a router, and others. Network 180 may comprise one or more LANs that may also be wireless. Network 180 may further include remote direct memory access (RDMA) hardware and/or software, transmission control protocol/internet protocol (TCP/IP) hardware and/or software, router, repeaters, switches, grids, and/or others.

In alternative embodiments, the number and type of clusters, servers, and storage devices is not limited to those shown in FIG. 5. Almost any number and combination of servers, desktop, nodes, and mobile clients may be interconnected in system 400 via various combinations of modem banks, direct LAN connections, wireless connections, WAN links, etc. Also, at various times one or more clusters and nodes may operate offline. In addition, during operation, individual client connection types may change as mobile users travel from place to place connecting, disconnecting, and reconnecting to system 400. In one embodiment of computing system 400, nodes 122*a*-122*b* are representative of any number of stationary or mobile computers such as desktop PCs, workstations, laptops, handheld computers, blade servers, etc. The data that holds the information used and produced by applications executed on nodes 122*a*-122*b* and stored for later use may be referred to as a computer file, or file. Computer files may include photographic or other still images, documents, video streams, audio files, plain text files, or any other kind of data. In some embodiments the nodes 122*a*-122*c* may include an operating environment, e.g. an operating system. Alternatively, as previously discussed, the nodes 122*a*-122*c* may comprise one or more VMs operating with hypervisor technology. Symantec Corp., VMWare, Inc., Microsoft Corp., and others may provide virtualization platform software. Each virtual machine may maintain its own set of files, similarly as a physical computer would, such as operating system files, application program files, data files, etc. Whereas the files of a physical computer are typically stored on a hard disk, the files of each virtual machine may be stored in one or more virtual disk image files. A virtual disk image file may be formatted according to a particular specification. Virtual disk image file specifications in common use include at least the Virtual Hard Disk (VHD) format, the V2I format, and the Virtual Machine Disk Format (VMDK) format.

In addition to including software applications, each node may contain backup system agent software. The backup system agent may be software configured to assist a backup manager, such as the backup manager 158 on the backup server 150, to perform one or more backup functions. In some embodiments the backup system agent may also be configured to perform one or more backup functions independently of a backup manager 158. Each VM may execute one or more applications. One or more of the applications executed on a node may have an associated frequently scheduled agent-based backup operation. For example, an IT administrator may setup a daily agent-based backup operation for data corresponding to one or more database applications.

In various embodiments a Network-Attached Storage (NAS) device 190 may be any kind of device configured to store data. The NAS device 190 may be a computer specialized for providing file storage services to clusters 120*a* and 120*b*. The operating system and other software on the NAS device 190 provide the functionality of file systems, and access to files, and the management of these functionalities. A NAS device 190 is typically not designed to perform general-purpose computing tasks other than file storage. The NAS device 190 may not have a keyboard or display, and is instead controlled and configured over the network 180, sometimes by accessing their network address from a web browser.

Continuing with a description of the NAS device 190, a general-purpose operating system is usually not needed on the NAS device 190. Rather, a stripped-down operating system with minimal functionality may be used instead. The NAS device 190 may include one or more hard disks, often arranged into logical, redundant storage containers or RAID arrays (redundant arrays of inexpensive/independent disks). The data 192 may be stored on one or more of the hard disks of the NAS device 190.

The NAS device 190 may provide data storage at the file system level. The NAS device 190 may use file-based protocols such as Network Technology File System (NTFS), SMB/CIFS (Server Message Block/Common Internet File System) (used with MS Windows systems), or AFP (used with Apple Macintosh Computers). In the example of FIG. 5, files on the NAS device 190 may be accessed through a Network File System (NTFS) interface included in network 180.

Turning now to the backup server 150 in computer system 400, the backup server 150 may include a backup application 158. This backup application 158, or "backup manager" may comprise program instructions stored on the memory 170 and executable by the processor 174 to perform one or more backup operations. Backup operations may include creating partial or full backups, e.g., on a computer system or from one computer system to another system; performing restore functions (e.g., partial or granular restore functions, or full restore functions) on a computer system or from one computer system to another computer system; backup operations may also include other operations.

As noted above, the backup system agent may assist the backup manager 158 on backup server 150. The backup manager 158 may be configured to create a volume image backup. In some embodiments, the backup manager 158 may receive user input directing the backup manager 158 to create a volume image backup of a specific system. In some embodiments, the backup manager 158 may create a volume image backup of a specific system automatically, e.g., the backup manager may be scheduled to perform regular backups of a specific system. As one example, the backup manager 158 might create a volume image backup. During this operation, in one embodiment, the volume data less the write-protected data subsets corresponding to nodes 122*a*-122*c* may actually be backed up rather than the full volume data. As part of creating the volume image backup, the backup manager 158 may also create catalog metadata 156 associated with the image.

The catalog metadata 156 created by the backup manager 158 during a backup operation may include metadata for the image. Metadata may include at least one or more of the following: a data name, data size, a fingerprint of the data, a batch number, as well as data type, version number, ownership, permissions, modification time, error code, etc. A batch number may be used to identify the particular backup operation in which an associated backup entry was created. Other forms of metadata and/or identifiers will be apparent to those of ordinary skill in the art. The catalog metadata 156 may be usable for restore browsing, e.g., at a later time. For example, the data layout of stored information in backup storage device 160 may be stored in the catalog 156.

In one embodiment, the backup server 150 comprises a file system 154 that operates as a special-purpose database for the storage, organization, manipulation, and retrieval of data. File system 154 may provide access to data by operating as clients for a network protocol. Alternatively, file system 154 may be virtual and exist only as an access method for virtual data. A user may browse the directories stored on backup storage device 160 via the file system 154.

Returning to a data backup operation, in one embodiment, the backup manager 158 on backup server 150 may create the volume image backup and store it on the backup storage device 160. In another embodiment, the backup manager 158 may store the volume image backup on the backup server 150, e.g., on a memory 170 of the backup server 150, as shown. In yet other embodiments, the backup manager 158 may instead store the volume image backup on another device, e.g., on another computer system (such as another server) connected over the network 180. In any of the embodiments, a backup copy 194 of the data 192 may be subsequently restored to the NAS device 190 (or to another computer system) in the event that it becomes necessary to do so. Recovery of the backup copy 194, such as a volume image backup file, may have a variety of uses. For example, it may be used during system deployment for the setup of many computers. Another use may include data recovery. The image-level backup file may allow rapid restoration of a system after data loss caused by an operating system crash, a virus attack, hardware failure, or otherwise.

In addition to the above, the backup copy 194 may allow for a bare metal recovery, wherein the backed up data is available in a form that allows for a computer system restoration from "bare metal", or without any requirements of a previously installed software or operating system. In such a case, the backed up data typically includes the necessary operating system, applications, and data components to rebuild the backed up system to an entirely separate platform. During deployment, recovery, or other use of the backup data, if only certain files are utilized, then it is possible to connect the image backup file as a virtual disk and then copy these files from the image backup file using a file utility software program.

It is noted that the backup copy 194 may not be formatted in a similar manner as the original copy of the data 192. The many available backup products may each use a commonly known file format or alternatively a proprietary file format for the storage of data. In one embodiment, the volume image backup file discussed above may contain the complete contents and structure representing a storage medium, such as data 192 on NAS device 190. This volume image backup file may be created by performing a complete sector-by-sector, or alternatively, a byte-by-byte, copy of the data on storage mediums within NAS device 190. This copy thereby replicates the structure and contents of this data.

A volume image backup file may contain all files and may replicate all data once the initial volume-level backup operation completes and any subsequent agent-based backup operations complete. In another embodiment, a backup system only backs up user files. The backup system may not backup boot information. Similarly, some disk imaging utilities omit unused file space from source media, or compress the disk they represent to reduce storage requirements. The resulting files are typically referred to as archive files, as they are not literally disk images. Therefore, data in backup storage device 160 may not be "portable", or may not be easily copied to alternative locations for various purposes. Regardless of the type of backup file, this file may be stored on backup storage device 160. Although, the above descriptions refer to a volume image backup file, the methods and systems described herein may be used with any type of backup file or any type of data file.

In an embodiment where the backup manager 158 creates the volume image backup and stores it on the backup storage device 160, the backup storage device 160 may include or be further coupled to storage consisting of one or more hard disks, tape drives, server blades, or specialized devices, and may include a variety of memory devices such as RAM, Flash RAM, MEMS (MicroElectroMechanical Systems) storage, battery-backed RAM, and/or non-volatile RAM (NVRAM), etc. The backup manager 158 may create and store the volume image backup in a commonly known file format, such as VHD, VMDK, V2I, or otherwise. Alternatively, the backup manager 158 may create and store the volume image backup in a proprietary file format.

It is further noted that the above-described embodiments may comprise software. In such an embodiment, the program instructions that implement the methods and/or mechanisms may be conveyed or stored on a non-transitory computer readable storage medium. Numerous types of non-transitory computer readable storage media, which are configured to store program instructions, are available and include hard disks, floppy disks, CD-ROM, DVD, flash memory, Programmable ROMs (PROM), random access memory (RAM), and various other forms of volatile or non-volatile storage.

In various embodiments, one or more portions of the methods and mechanisms described herein may form part of a cloud computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for use in a computing system, the method comprising:
   in response to detecting a condition:
   identifying virtual resources in a first node comprising one or more virtual machines (VMs);
   conveying from the first node a query to a virtual subsystem of a second node comprising one or more VMs, wherein the query requests identification of virtual resources in the second node;
   receiving from the second node identification of virtual resources in the second node;
   combining the received identification of virtual resources from the second node with identification of virtual resources in the first node; and
   in response to receiving a volume-level backup request, performing a volume-level backup of a volume of data shared by each of the first node and the second node, wherein a portion of the volume corresponding to data identified by the received identification of virtual resources from the second node is not backed up.

2. The method as recited in claim 1, wherein the detected condition includes at least one of: a discovery request from a backup server, a beginning of each backup or restore operation, and during a backup or restore operation when the first node does not include a corresponding controlling highly available (HA) VM.

3. The method as recited in claim 1, wherein identification of virtual resources comprises at least identification of VMs in a respective node and identification of stored data corresponding to the identified VMs in the respective node, further comprising performing an agent-based backup subsequent the volume-based backup for said portion of the volume.

4. The method as recited in claim 3, further comprising conveying from the first node a query to a cluster subsystem requesting identification of highly available (HA) VMs included in the second node.

5. The method as recited in claim 4, further comprising sending configuration information to a backup server for subsequent backup and restore operations, wherein the configuration information includes at least one of: information in a response from the cluster subsystem, said combined identification of virtual resources, and identification of highly available (HA) VMs in the first node.

6. The method as recited in claim 4, further comprising sending configuration information to a backup server for subsequent backup and restore operations, wherein the configuration information does not include write-protected data subsets within data stored in the VMs, wherein the configuration information does include at least one of: information in a response from the cluster subsystem, said combined identification of virtual resources, and identification of highly available (HA) VMs in the first node.

7. The method as recited in claim 4, wherein in response to a restore request corresponding to a given VM, the method further comprises:
   identifying the given VM as a highly available (HA) VM;
   taking offline cluster resources corresponding to the given VM prior to a restore operation; and
   placing online the cluster resources corresponding to the given VM after completion of the restore operation.

8. The method as recited in claim 7, wherein taking cluster resources offline comprises at least removing an identifier corresponding to the given VM from corresponding configuration files and inventory lists.

9. A computer system comprising:
   a first node comprising one or more virtual machines (VMs);
   a second node comprising one or more VMs; and
   a data storage medium coupled to the first node and the second node, wherein the data storage medium is configured to store data corresponding to the one or more VMs comprised within the first node and the second node;
   wherein in response to detecting a condition has occurred, the first node is configured to:
   identify virtual resources in the first node;
   convey a query to a virtual subsystem of the second node requesting identification of virtual resources in the second node;
   receive from the second node identification of virtual resources in the second node;
   combine the received identification of virtual resources with identification of virtual resources in the first node; and
   in response to receiving a volume-level backup request, perform a volume-level backup of a volume of data shared by each of the first node and the second node, wherein a portion of the volume corresponding to data identified by the received identification of virtual resources from the second node is not backed up.

10. The computer system of claim 9, wherein the detected condition includes at least one of: a discovery request from a backup server, a beginning of each backup or restore operation, and during a backup or restore operation when the first node does not include a corresponding controlling highly available (HA) VM.

11. The computer system of claim 9, wherein identification of virtual resources comprises at least identification of VMs in a respective node and identification of stored data corresponding to the identified VMs in the respective node, wherein the second node is further configured to perform an agent-based backup subsequent the volume-based backup for said portion of the volume.

12. The computer system of claim 11, wherein the first node is further configured to convey a query to a cluster subsystem requesting identification of highly available (HA) VMs included in the second node.

13. The computer system of claim 12, wherein the computer system further comprises a backup server, wherein the first node is further configured to send configuration information to the backup server for subsequent backup and restore operations, wherein the configuration information includes at least one of: information in a response from the cluster subsystem, said combined identification of virtual resources, and identification of highly available (HA) VMs in the first node.

14. The computer system of claim 12, wherein the computer system further comprises a backup server, wherein the first node is further configured to send configuration information to the backup server for subsequent backup and restore operations, wherein the configuration information does not include write-protected data subsets within data stored in the VMs, wherein the configuration information does include at least one of: information in a response from the cluster subsystem, said combined identification of virtual resources and identification of highly available (HA) VMs in the first node.

15. The computer system of claim 12, wherein in response to a restore request corresponding to a given VM, the first node is further configured to:
   identify the given VM as a highly available (HA) VM;
   take offline cluster resources corresponding to the given VM prior to a restore operation; and place online the cluster resources corresponding to the given VM after completion of the restore operation.

16. The computer system of claim 15, wherein to take cluster resources offline, the first node is further configured to at least remove an identifier corresponding to the given VM from corresponding configuration files and inventory lists.

17. A non-transitory computer-readable storage medium storing program instructions executable by at least one processor, wherein the program instructions are executable to:
in response to detecting a condition has occurred:
identify virtual resources in a first node comprising one or more virtual machines (VMs);
convey from the first node a query to a virtual subsystem of a second node comprising one or more VMs, wherein the query requests identification of virtual resources in the second node;
receive from the second node identification of virtual resources in the second node;
combine the received identification of virtual resources from the second node with identification of virtual resources in the first node; and
in response to receiving a volume-level backup request, perform a volume-level backup of a volume of data shared by each of the first node and the second node, wherein a portion of the volume corresponding to data identified by the received identification of virtual resources from the second node is not backed up.

18. The non-transitory computer-readable storage medium of claim 17, wherein the program instructions are further executable to:
convey from the first node a query to a cluster subsystem requesting identification of highly available (HA) VMs included in the second node; and
perform an agent-based backup subsequent the volume-based backup for said portion of the volume.

19. The non-transitory computer-readable storage medium of claim 18, wherein the program instructions are further executable to send configuration information to a backup server for subsequent backup and restore operations, wherein the configuration information does not include write-protected data subsets within data stored in the VMs, wherein the configuration information does include at least one of: information in a response from the cluster subsystem, said combined identification of virtual resources, and identification of highly available (HA) VMs in the first node.

20. The non-transitory computer-readable storage medium of claim 19, wherein in response to a restore request corresponding to a given VM, the program instructions are further executable to:
identify the given VM as a highly available (HA) VM;
take offline cluster resources corresponding to the given VM prior to a restore operation; and
place online the cluster resources corresponding to the given VM after completion of the restore operation.

* * * * *